Aug. 22, 1967       A. C. O'HARA, JR       3,337,860
                    DISPLAY TRACKING SYSTEM
Filed Dec. 31, 1964                        3 Sheets-Sheet 1
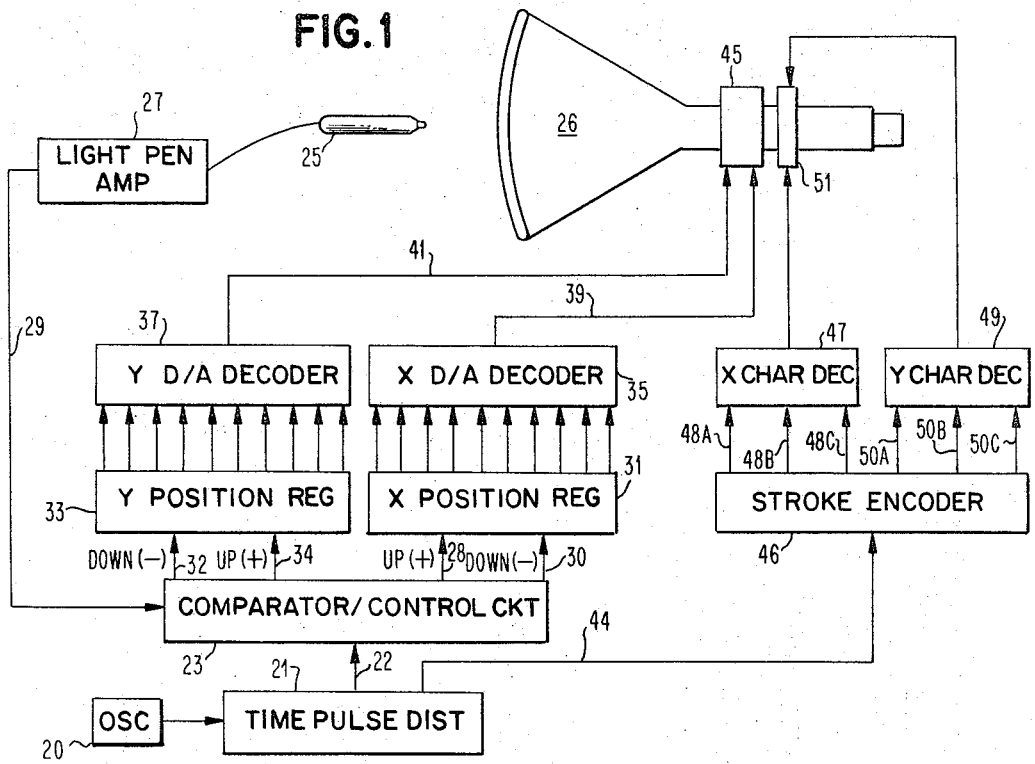
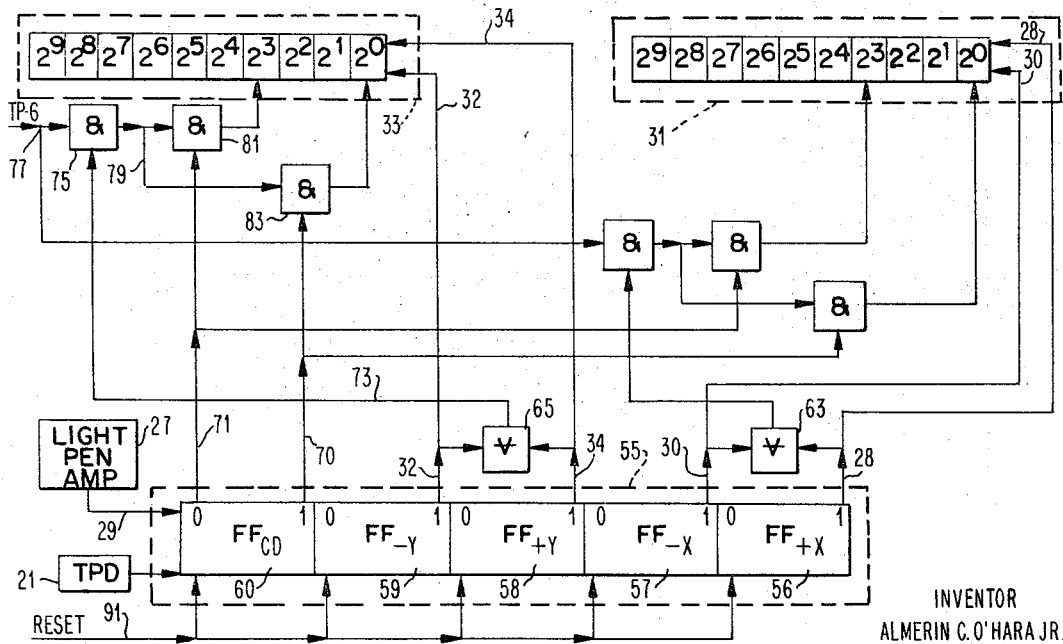
INVENTOR
ALMERIN C. O'HARA JR.
BY *Joseph J. Connors*
ATTORNEY

FIG. 5
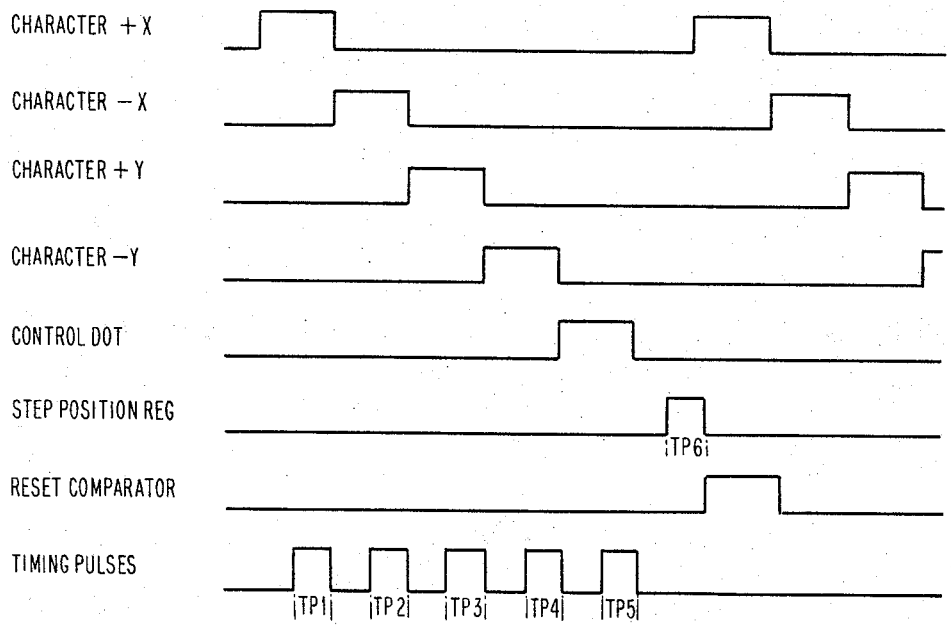
FIG. 6
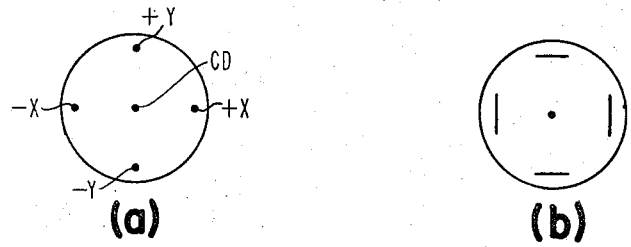
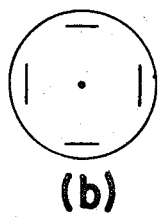
(a)        (b)
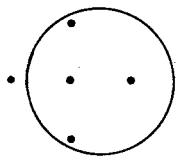 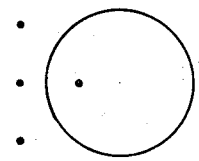 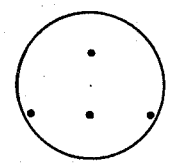 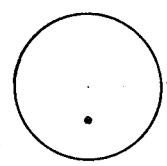
(c)     (d)     (e)     (f)

United States Patent Office 3,337,860
Patented Aug. 22, 1967

3,337,860
DISPLAY TRACKING SYSTEM
Almerin C. O'Hara, Jr., Woodstock, N.Y., assignor to International Business Machines Corporation, New York, N.Y., a corporation of New York
Filed Dec. 31, 1964, Ser. No. 422,844
8 Claims. (Cl. 340—324)

The present invention relates to display systems and techniques, and more particularly to a cathode ray tube display system for providing an indication of the position and speed of an associated light transducer.

In certain applications such as image processing or graphic display systems, it is frequently desirable to allow an operator to draw or write on the face of a cathode ray tube utilizing an associated light transducer. Such operations are uniquely desirable in design, for example, where it is desired to either design or modify an existing design using a cathode ray tube where the subject being drawn or modified is available for immediate viewing. In addition to the basic problem of providing a system for tracking which will position and cause the CRT beam to follow the direction specified by the light transducer, an additional problem is introduced since the speed of the transducer will vary from operator to operator. As herein employed, the term light transducer includes light pens, light pencils, light guns, etc., the difference being limited to the physical packaging configuration. It is therefore desirable to have a light pen tracking system which will allow an operator to draw on a cathode ray tube and will automatically compensate for any variations in velocity of the light pen movement within a specified range.

In accordance with the present invention, there is provided a light pen tracking or line following system which provides an indication of pen speed as well as direction. In the present system, a special track character or marker symbol which may comprise an open rectangle with a dot in the center or a series of dots with a dot in the center portion thereof is employed. The size of the track character corresponds essentially to the circular field of view of the light pen. If the field of view of the pen is slightly displaced from the center of a tracking pattern, portions of the tracking character or marker pattern will be "seen" by the pen, the remainder will not. The particular portion of the marker character detected by the light pen dictates which direction to move the tracking pattern so as to follow the pen, assuming portions of the marker symbol remain within the field of view of the pen. In the present system, information identifying the horizontal and vertical coordinate positions of the light pen are stored in digital form in pen position registers or counters. When the pen is moved, a certain displacement of the marker symbol will take place with respect to the field of view of the light pen depending on the pen velocity. This displacement is identified by output signals from the light pen as the marker symbol is continuously retraced. When a large displacement is detected, the tracking circuitry can update or move the marker symbol by a large increment using the digital technique of stepping a high order position or positions of the pen position registers during the time the pen is traveling at high velocity. When the pen is traveling at low velocity, the tracking pattern will be updated in small increments by stepping the low order positions of the light pen registers. Thus, depending on the velocity of the light pen, either the low or high order of the position register will be stepped. By this means, the light pen is enabled to track at high or low speed without sacrificing precision, using a single logic implementation. The system in addition to providing an indication of light pen velocity, affords a substantial saving of display time in the tracking operation compared with known systems of the prior art.

Accordingly, a primary object of the present invention is to provide an improved light pen tracking system.

Another object of the present invention is to provide a high precision light pen tracking system utilizing digital techniques to generate the appropriate deflection signals for the associated cathode ray tube.

Another object of the present invention is to provide an improved light pen tracking system for providing an indication of pen position, direction and velocity.

A further object of the present invention is to provide an improved display system which provides coarse and fine positioning of a special character on a CRT in accordance with the velocity of the light transducer.

The foregoing and other objects, features and advantages of the invention will be apparent from the following more particular description of a preferred embodiment of the invention, as illustrated in the accompanying drawings.

In the drawings:

FIGURE 1 illustrates in block form the overall light pen tracking system of the present invention.

FIGURE 2 illustrates in block logical form details of the comparator control circuit and pen position registers shown in block form in FIG. 1.

Figure 3:
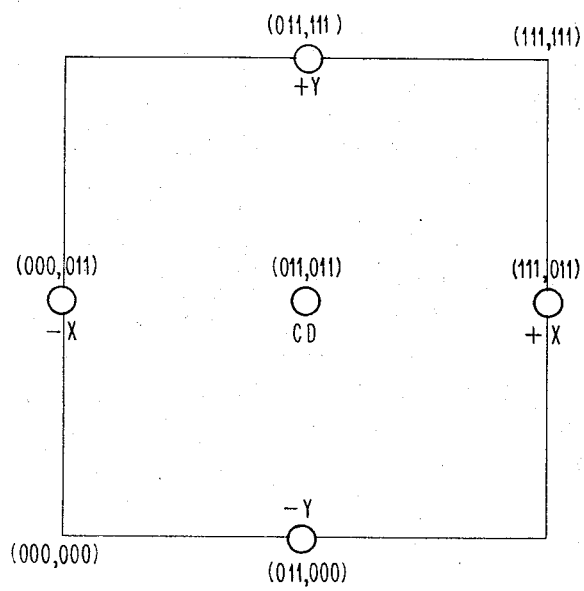

FIGURE 3 indicates in block logical form details of the stroke encoder shown in block form in FIGURE 1.

Figure 4:
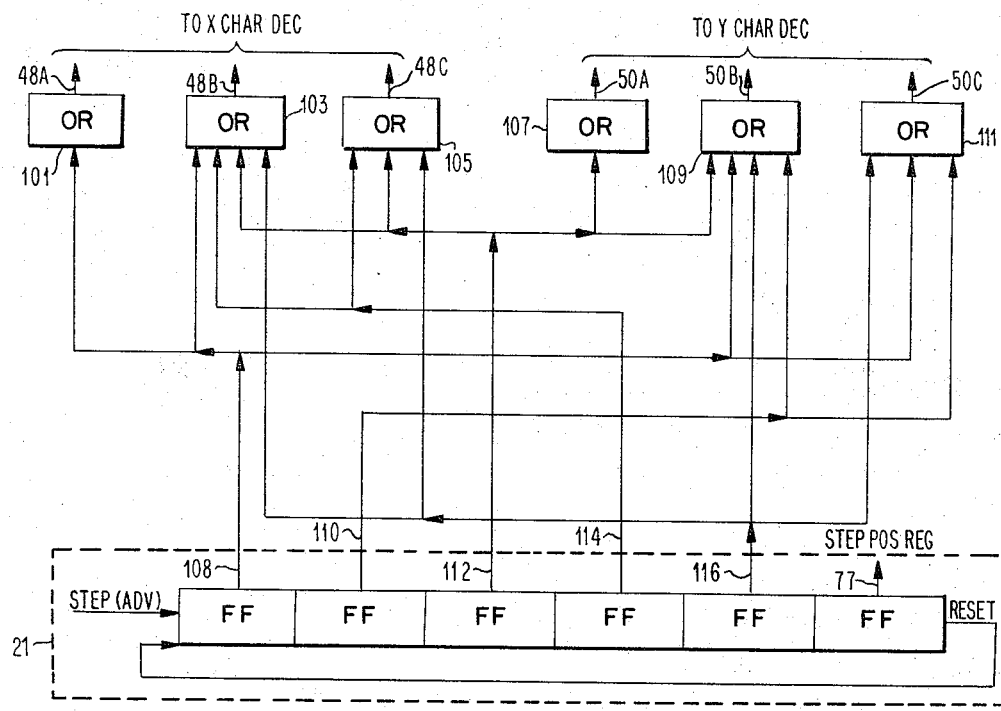

FIGURE 4 illustrates the digital coordinate addresses of the various portions of the marker pattern.

FIGURE 5 illustrates a timing chart for operation of the system shown in FIGURE 1.

FIGURE 6 illustrates the relationship between the marker pattern and the field of view of the pen with respect to various pen movements.

Before referring specifically to the drawings, a brief reference will be made to certain problems unique to an image processing system and to the solution of which the present invention is directed. Where a light sensitive transducer is used in conjunction with a CRT display system for the purpose of allowing an operator to draw on the cathode ray tube, and where a simple single element light sensitive device is used in the transducer for the purpose of detecting the CRT beam, a complex character pattern is usually required in order to provide sufficient information to a set of control circuitry to position the CRT beam under the light pen in such a manner as to follow the pen motion. The technique of following the motion of a light pen on a cathode ray tube is what is referred to as light pen tracking. Depending on the operator utilizing the light pen or the nature of the pattern being drawn, the displacement of the light pen will vary in any given interval ΔT between position updatings. By means of the present invention, when large displacements are detected, the tracking circuitry can step the tracking pattern by large increments while conversely when the pen is traveling at low velocity, the tracking pattern is updated by spacing the tracking pattern in small increments. At medium velocity, alternate groups of small and large steps occur. In one known system of the prior art, a substantial amount of time was required to continuously update the light pen, which time was not available for the actual display functions. This prior art system utilized approximately 40% of the available display time for the light pen tracking function. The present invention by comparison utilizes only approximately 5% of the overall display time to provide the light pen function, while simultaneously providing a high or low velocity high precision tracking system.

Referring now to the drawings and initially to FIGURE 6, two configurations of the marker symbol are shown with respect to the field of view of the light pen, one marker symbol (FIG. 6a) comprising a series of five dots emenating from a centrally located dot, the second symbol (FIG. 6b) comprising an open rectangular pattern with a dot at the center portion thereof. The field of view of the associated light transducer is identified by the circumscribed circle. For purposes of illustration, the present invention will be described with respect to the dot configuration of FIG. 6a, although it will be understood by those skilled in the art that various other forms of spatially oriented indicia could be readily substituted in the present invention. While the specific details of generating the special character are not considered essential to an understanding of the present invention, in practice the special character is generated by cathode ray tube character generator means wherein the character is generated in a predetermined sequence or one stroke at a time. One suitable CRT character generator for generating the special character is shown and described in copending application Ser. No. 90,678 now Pat. No. 3,248,725 entitled, "Display System and Associated Method," filed by Paul R. Low et al., Feb. 21, 1961 and assigned to the assignee of the instant invention. The light pen effectively senses for the relative position of the character with respect to its field of view such that if the pen is not wholly centered over the character, the logic will be informed and take corrective action to place the character completely within the optical field of the light pen. As each of these light spots is generated or retraced, there is a blue flash visible to the light pen followed by a relatively yellow decay, the blue flash causing the transducer to emit a pulse as each segment of the marker symbol is retraced. Thus the light pen is enabled to "see" a pseudo-portion of the special character at any given instant in time. The logic of the instant invention is based on the fact that each segment of the special character has a specific time slot assigned to it which may be logically ANDed to a time pulse generated during the intensification or re-intensification of that segment. Depending on the direction of pen motion, one or more of the marker symbol component portions will be outside the field of view of the light pen and its detection initiates the tracking logic to move the character within the field of view of the pen, thereby simultaneously drawing a line on the screen of the CRT. As more fully described hereinafter, the coarse or fine correction is determined by whether the center dot of the marker symbol is within or without the field of view of the transducer.

Referring now to FIGURE 1, there is illustrated in block logical form a pen tracking system in accordance with the present invention. A time pulse distributor 21 under control of oscillator 20 applies sequential timing pulses via line 22 to a comparator control circuit shown as block 23, which receives as its second input the output from light pen 25 which is amplified by light pen amplifier 27 and applied through line 29. Essentially, light pen 25 comprises a light transducer which is actuated by generation or re-generation of a spot on cathode ray tube 26 within its field of view and transmits a signal indicative of this spot to an output device, which, in the instant invention, comprises light pen amplifier 27. Light transducers in the form of light pens, pencils, guns, etc., are well known in the art, one example in the form of a light gun being shown in U.S. Patent No. 2,915,643 to R. G. Mork, issued Dec. 1, 1959 and entitled "Light Gun Assembly." The operation of the light gun in the above referenced patent is identical to the light pen employed in the present invention, the only difference being in the specific physical configuration or package of the transducer. In response to the light pen input, as the marker symbol is scanned or regenerated, a signal designating the direction of light pen movement will be applied to the X position register 31 through lines 28, 30 and the Y position register 33 through lines 32, 34. Lines 28 and 34 are count up control lines, lines 30 and 32 are count down control lines. Registers 31 and 33 are count up or count down counters which will effectively add or subtract a count in accordance with the pattern of the marker symbol detected by the light pen. Such counters are considered conventional and well developed in the art so that the details have been omitted from the drawings in the interest of clarity. The details of the comparator control circuit and the manner in which signals indicative of the movement of the light pen are identified and acted upon are shown and described in further detail with respect to FIGURE 2. Effectively, the X and Y position counters or registers contain the digital quantities that ultimately control the position of the CRT electron beam. Therefore, by altering the X and Y quantities in accordance with the movement of the light pen, the X and Y position registers are stepped up or down according to the movement of the light pen.

The outputs from the X and Y position registers 31 and 33 are applied to digital to analog decoders 35 and 37 respectively, wherein the digital signals are converted to corresponding analog signals and applied through lines 39 and 41 to the main positioning yoke 45. Digital to analog decoders 35 and 37 are preferably of the type shown and described in copending application Ser. No. 276,569 now Patent No. 3,290,671 "Byte Decoder" filed by William R. Lamoureux, Apr. 29, 1963 and assigned to the assignee of the instant invention. The output from time pulse distributor 21 is also applied via line 44 to stroke encoder 46. Stroke encoder 46, in combination with the timing pulse generator, generates the control signals for the five component dots of the marking symbol into the address form shown in FIGURE 4. Details of the encoder are more fully shown and described with reference to FIG. 3. The stroke encoder generates a series of signals for each of the marker symbol segments which are applied via lines 48A, 48B, 48C to the X character decoder 47 and via lines 50A, 50B and 50C to the Y character decoder 49. The X and Y character decoders 47 and 49 are conventional three bit digital to analog converters which essentially generate the appropriate X and Y character deflection signals to cause the component segments of the track character to be continuously regenerated in a predetermined sequence and applied to the character positioning yoke 51. Alternately, the signals could be provided from a read only memory unit of the aforenoted copending application Ser. No. 90,678 now Pat. No. 3,248,725. The CRT display system utilized in the preferred embodiment of the present invention utilizes two magnetic deflection yokes, a main positioning yoke 45 and a character positioning yoke 51, the main positioning yoke designating the area on the CRT where the marker symbol is to be displayed and the character deflection yoke generating the dot or stroke pattern of the marker symbol. The blank and unblank control circuitry utilized in the instant invention is assumed to be of conventional nature and has accordingly been omitted from the drawings in the interest of clarity.

Referring now to FIGURE 2, there is illustrated in detail the logical configuration of the comparator control circuit and associated X and Y position counters shown in block form in FIGURE 1. The output from light pen amplifier 27 is applied through line 29 to the first stage of a five stage shift register 55 which is shifted in sequence by shift line 53. The specific shifting sequence is shown and fully described with reference to the timing diagram of FIGURE 5.

Referring briefly to FIG. 6a, the right and left most dots in the track character are defined as +X and −X respectively, the upper end lower vertical dots as +Y and −Y respectively, and the center dot is indicated as CD. The specific generation sequence employed in the present invention is +X and −X, +Y and − followed by the center dot, the five signals being entered into shift register 55 and shifted by timing pulses TP1–TP5 in that specific sequence.

Referring briefly to FIGURES 6c, d, e and f, the two potential increments of movement of the light pen with respect to the special track character, i.e., horizontal and vertical, are shown relative to the X and Y direction. In FIG. 6c, the light pen has moved to the right but the center dot of the tracking character is still within the field of view of the pen. In FIG. 6d, it is seen that only the right most segment of the marker symbol (+X) is within the field of view of the light pen and the center dot is without. FIGURES 6e and 6f illustrate corresponding movements in the vertical direction. In the first instance (FIG. 6c), so long as one dot and the center dot lie within the field of view of the light pen, this indicates that the pen was moved at relatively low velocity and only the low order position of the X deflection register will be stepped. In the second situation (FIG. 6d) where the center dot lies outside the field of view of the pen, it is necessary to correct a larger increment and accordingly to step a high order position of the X deflection register and thus bring the tracking character within the field of view of the light pen. Under two situations, no further action will be taken. If all the dots are within the field of view of the light pen, obviously no movement has taken place and no corrective action is required; if none of the dots are within the field of view of the pen, the velocity of the pen movement will be assumed outside the range of the present system and no action will be taken. While only corrections in a single direction are shown in FIG. 6 in the interest of clarity, it is obvious that substantially simultaneous corrections in two directions may be made.

Returning now to FIGURE 2, it is seen that the binary one outputs of the +X and −X stages 56 and 57 of the shift register are applied through lines 28 and 30 to an Exclusive OR circuit 63, while the binary one output from stages 58 and 59 are applied through lines 34 and 32 to Exclusive OR circuit 65. The center dot stage 60 has a binary one and zero output on lines 70 and 71 respectively. Considering the operation of the Y section which is identical to the X section, an output will be provided from Exclusive OR circuit 65 only if either the +Y or −Y lies without the field of view of the light pen; no output will be provided from the exclusive OR circuit 65 if both Y signals are either fully within or fully without the field of view of the light pen. Assuming that the +Y or −Y segment is within the field of view of the light pen, an output will be provided on line 73 to a logical AND circuit 75. The succeeding timing pulse TP-6 is applied through line 77 to sample AND circuit 75 which, if conditioned by the output from exclusive OR circuit 65, will provide an output on line 79 to sample logical AND circuits 81 and 83 respectively. If the center dot was within the field of view of the light pen, a signal indicative of this is provided on output line 70 to condition logical AND circuit 83; conversely, if the center dot was not within the field of view of the light pen, an output is provided on line 71 to condition logical AND circuit 81. Thus depending on the relative position of the center dot with respect to the field of view of the light pen, either a low order position or a higher order position of the X position register will be stepped. Assuming that the center dot was within the field of view of the light pen, logical AND circuit 83 is conditioned and the sampling signal on line 79 will provide an output to step the low order stage of the position register. Assuming that the center dot is not within the field of view of the light pen, then logical AND circuit 81 is conditioned and the sampling signal on line 79 will provide an output on line 87 to step the fourth or 2³ stage of the Y position register. The final determination of whether to step the counter up or down depends on which of the signals were without the field of view of the light pen. If the +Y signal was detected, this indicates that the pen was moved in an upward direction and accordingly, line 34 will cause the counter to step up. Correspondingly, if the −Y segment was within the field of view of the light pen, line 32 will be actuated to indicate that the character must be stepped down to correspond to the movement of the pen. Such counters and techniques for controlling the stepping up or down of any stage step-up step-down counter are considered well known in the art and accordingly, has been illustrated in block form in the interest of clarity. An identical logical configuration is employed to control the bi-directional bi-level stepping of the X Position Register 31. At the end of each operation or prior to starting, a reset pulse is applied to line 91 to clear shifting register 55.

Referring now to FIGURE 3, there is illustrated the relative positioning and addressing scheme used to identify the component segments making up the tracking character. The character will be positioned at a particular location on the CRT screen by the main positioning yoke 45, the origin for the tracking character being arbitrarily defined as the lower left hand corner indicated as X and Y addresses of 000,000. The X component moves to the right as defined as positive, and vice-versa, while movements of the Y segments in the upward direction are also labeled positive and vice-versa. With respect to the origin, the center dot is identified by X and Y addresses of 011,011.

The −X segment is identified by X and Y addresses of 000,011, the +X segment is identified by addresses 111,011. The +Y segment is identified by X and Y addresses of 011,111 and the −Y segment is identified by addresses of 011,000 respectively. As previously described with respect to FIGURE 2, in the preferred embodiment herein described, the +X and −X, the +Y and −Y and the center dot are continuously reintensified and detected in that particular sequence, although it will be appreciated that the particular sequence herein employed is purely a matter of design choice, the only requirement in the tracking operation herein described being that the marker symbol segments be continuously reintensified in some specified sequence whereby each of the segments has a specific time slot associated therewith.

It should be noted that, in the preferred embodiment, the position coordinates contained in position registers 31 and 33 refer to the center element of the marker symbol, whose relative coordinates are shown to be 011,011. This offset of the origin of the marker symbol from the indicated positioned coordinates in order to bring the center dot segment C.D. into correspondence with the indicated positional coordinates is accomplished in the preferred embodiment by applying a negative current bias to the inputs of character yoke 51.

Referring now to FIGURE 4, there is illustrated in logical block form the stroke encoder shown as block 46 in FIGURE 1. The basic function of the stroke encoder is to continuously regenerate signals representative of the X and Y addresses of each segment of the marker symbol in the heretofore prescribed sequence, the specific X and Y addresses for each of the segments being shown in FIGURE 3. Essentially, the stroke encoder comprises a six position time pulse distributor in which five of the timing pulses are used to encode three bit binary addresses signals indicative of the five segments of the marker symbol, while the sixth timing pulse is used to step the position registers. The time pulse distributor comprises a six stage timing ring which is closed upon itself by the reset line. As is well known in the art, a timing ring is a device which will generate timing pulses in a specific predetermined sequence, in the illustrated embodiment, sequencing from stages 1–6. Since the inputs to the character decoding circuits will be the +X, −X, +Y, −Y and center dot segments in that order, lines 108, 110, 112 and 114 and 116 are respectively associated with the indicated segments. The output from the stroke encoder is provided on lines 48A, 48B and 48C, 50A, 50B and 50C as broadly indicated in FIGURE 1, from six associated logical OR circuits 101–111. As an example, referring to FIGURE 3, the X and Y addresses for the +X segment are 111,011. Referring to FIGURE 4, line 108 representative of the +X segment is connected to logical OR circuits 101, 103 and 109, 111 to generate the prescribed X and Y address signals. The center dot as a second example has an X and Y address of 011,011. Line 116 representative of the center segment is connected to logical OR circuits 103, 105 and 109, 111 to provide the aforenoted address signals. In like manner, each of the remaining three segment lines 110, 112 and 114 are connected to provide signals corresponding to the addresses indicated for the respective segments in FIGURE 3. The sixth output from the timing ring, identified as line 77, comprises the TP6 timing pulse used to step the respective X or Y register in the manner indicated and heretofore described with respect to FIGURE 2. While a six position timing ring is shown in FIGURE 4, it is obvious that the number of stages will be directly related to the specific configuration of the marker symbol and the number of segments required to define the symbol so that a greater or lesser number of stages could readily be provided. The outputs from respective logical OR circuit 101, 103 and 105 on lines 48A, 48B and 48C are applied to the X character decoder as shown in FIGURE 1 while, the outputs from logical OR circuit 107, 109 and 111 on lines 50A, 50B and 50C are applied to the Y character decoder shown in FIGURE 1, the respective X and Y character decoders providing a single analog signal corresponding to the binary digital signal applied thereto to the character yoke which ultimately positions the CRT beam to generate and regenerate the segments comprising the marker symbol.

Referring now to FIGURE 5, there is illustrated a timing diagram to clarify the sequence of operation of certain of the elements heretofore described. Lines 1–5 in the timing diagram illustrate the signals used to generate the identified components of the marker symbol employed in the preferred embodiment of the invention. These signals terminate with their associated timing pulses TP1–TP5 but are initiated before the timing pulses to provide time for the character deflection yoke 51 to settle down. The TP6 timing pulse shown on line 6 of the timing diagram is that stepping pulse which controls the positioning of the X and Y position registers as shown and described relative to FIGURE 2. The reset comparator pulse on line 7 corresponds to the reset line 91 illustrated in FIGURE 2. The timing pulses TP1–TP5 are those generated by the initial five stages of timing ring 21 as illustrated in FIGURE 4. Timing pulses 1–5 are generated by the timing ring in FIGURE 4 and are utilized in the preferred embodiment of the invention to unblank the CRT beam at each of the segment positions of the marker symbol. The TP1 and 2 correspond to the +X and −X, TP3 and 4 to the +Y and −Y and TP5 to the center dot CD.

While a preferred embodiment of the instant invention has been shown and described, it is obvious to one skilled in the art that various modifications and permutations of the novel concept herein described may be provided. For example, the technique with certain modifications could be extended to line following on a CRT as contrasted to the transducer following technique taught in the instant invention. Any type of open or closed indicia pattern could be suitably substituted for that shown and described in the preferred embodiment. The ultimate detection capabilities of marker symbol technique described in the preferred embodiment could be extended by having one dot segment associated with each position of the X and Y position registers.

While the invention has been particularly shown and described with reference to a preferred embodiment thereof, it will be understood by those skilled in the art that various changes in form and details may be made therein without departing from the spirit and scope of the invention.

What is claimed is:

1. A display device including a light source, means associated with said light source for generating a tracking symbol comprising a plurality of spatially oriented indicia on said display device,
each of said indicia elements in said symbol being generated in a predetermined timing sequence,
an optical transducer,
said transducer having a field of view adapted to encompass all of said indicia elements and generate response signals for detected indicia permutations,
means for analyzing the timing responses of said detected indicia permutations to provide an indication of the relative spatial relationship of indicia detected by said transducer,
and control logic responsive to the analysis of said detected indicia permutations for generating beam deflection signals to modify the relative position of said indicia and said transducer to reposition said indicia in the field of view of said transducer.

2. A device of the character claimed in claim 1 wherein said means for modifying said beam deflection means comprises control means connected between said transducer and said beam deflection means and wherein said detected indicia permutations vary in accordance with the motion of said light transducer.

3. A device of the character claimed in claim 1 wherein said control logic means is responsive to the direction and velocity of said light transducer.

4. Apparatus of the character claimed in claim 1 wherein said control logic means includes a counter for each axis of said display, said counters being connected to said beam deflection means.

5. Apparatus of the type claimed in claim 4 wherein said counters may be selectively incremented or decremented at low or high order portions thereof in accordance with the direction and velocity of said transducer.

6. An electro-optical system for generating a coordinate display under external control comprising in combination,
a cathode ray tube having beam generation means, beam deflection means and a screen,
means for displaying a marker symbol on the screen of said cathode ray tube,
said marker symbol comprising a plurality of indicia oriented in a predetermined coordinate display spatial relationship and generated in a predetermined time sequence,
a light transducer,
said transducer having a field of view adapted to detect said spatially oriented indicia permutations in accordance with the direction of motion of said transducer,
and control means responsive to the permutation and time sequence of marker indicia detected by said light transducer for generating correction signals to modify said beam deflection means to enable said beam to follow the motion of said transducer.

7. A device of the character claimed in claim 6 wherein said control means comprises a logical configuration adapted to automatically generate appropriate correction signals in response to selective permutations of said marker indicia.

8. A device of the character defined in claim 6 wherein said control means is adapted to generate coarse or fine deflection increments in accordance with the velocity of said light transducer.

References Cited

UNITED STATES PATENTS

| | | | |
|---|---|---|---|
| 2,553,245 | 5/1951 | Espenshied | 340—324.1 |
| 3,037,192 | 5/1962 | Everett | 340—324.1 |
| 3,089,918 | 5/1963 | Graham | 178—19 |
| 3,229,100 | 1/1966 | Greaniss | 315—10 |

NEIL C. READ, *Primary Examiner.*

A. J. KASPER, *Assistant Examiner.*